May 31, 1949.   L. F. THIRY   2,472,029
VIBRATION DAMPING MOUNTING
Filed Dec. 4, 1944

INVENTOR.
Leon F. Thiry
BY Evans + McCoy
ATTORNEYS

Patented May 31, 1949

2,472,029

UNITED STATES PATENT OFFICE 2,472,029

VIBRATION DAMPING MOUNTING

Leon F. Thiry, Montclair, N. J., assignor to The General Tire & Rubber Company, Akron, Ohio, a corporation of Ohio Application December 4, 1944, Serial No. 566,418

6 Claims. (Cl. 248—358)

This invention relates to vibration damping mountings and particularly to panel mounts suitable for supporting instruments such as radio receiving and transmitting apparatus on an airplane.

The invention has for an object to provide a support of the type in which a confined bushing of elastic rubber is employed as a supporting cushion and in which adjustable bushing engaging elements are provided by means of which the deflection characteristics of the bushing may be varied.

A further object of the invention is to provide stops for limiting the amplitude of the movement of the cushioned element in either direction axially of the bushing.

Another object of the invention is to provide movement limiting stops that have elastic snubbing cushions for absorbing impact shocks.

A further object of the invention is to provide means for simultaneously adjusting the bushing engaging and movement limiting elements in such manner that the range of movement permitted in either direction may be increased or decreased simultaneously with a decrease or increase in the stiffness of the cushion.

With the above and other objects in view, the invention may be said to comprise the mounting as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which.

Figure 1:
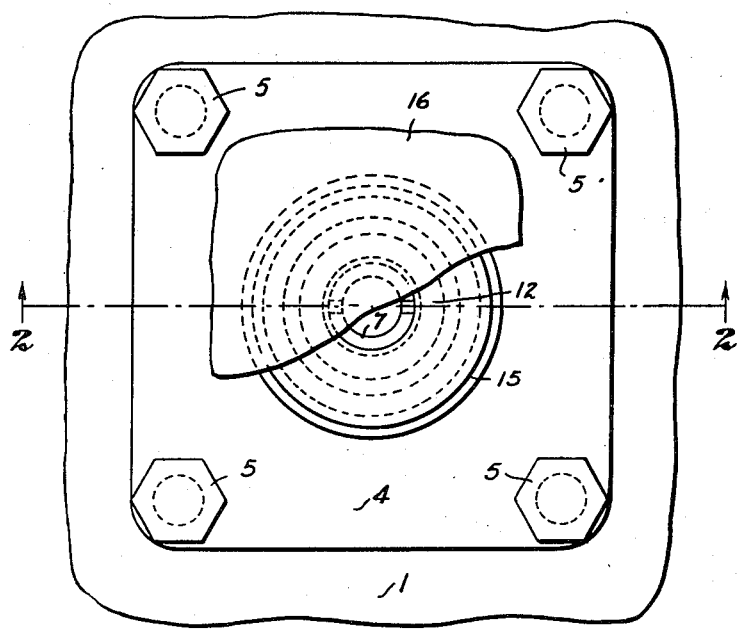
Fig. 1 is a top plan view of a mounting embodying the invention.
Figure 2:
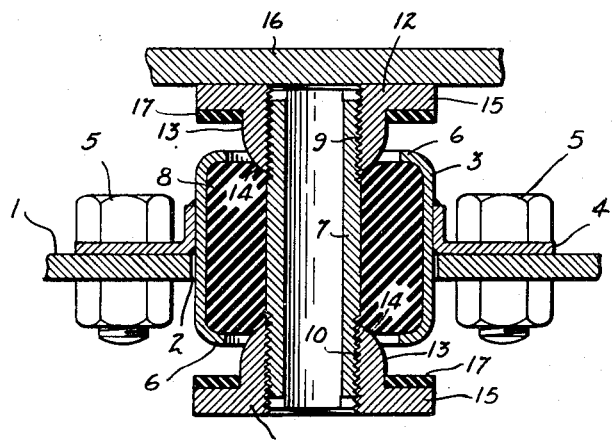
Fig. 2 is a vertical section taken on the line indicated at 2—2 in Fig. 1.

In the accompanying drawings, a mounting embodying the invention is shown applied to a fixed panel 1 that is provided with an opening 2 to receive a supporting sleeve 3 that is disposed with its axis at right angles to the panel and provided with a peripheral attaching flange 4 secured to the panel 1 by means of bolts 5. The sleeve 3 is provided with short inturned flanges 6 at its opposite ends and a post 7 extends centrally through the sleeve, the post 7 being resiliently supported by means of an elastic rubber bushing 8 that is confined between the post 7 and the interior of the sleeve 3.

The length of the bushing 8 is such that it fits between the inturned flanges 6 of the sleeve and the bushing 8 is preferably held under radial compression between the post 7 and the sleeve 3. The bushing 8 may be assembled with the post and sleeve by the method disclosed in my Patent 1,782,770, November 25, 1930. The post 7 has spaced threaded portions 9 and 10 which receive internally threaded collars 11 and 12. Each collar has a body portion 13 of an external diameter that is less than the internal diameter of the sleeve flanges 6, and a tapered externally beveled inner end 14 which engages with an end of the bushing 8 adjacent the periphery of the post and radially inwardly of the flanges 6 of the sleeve. Each of the collars is also provided with a peripheral flange 15, the flanges 15 of the collars overlying opposite ends of the sleeve 3 and being normally spaced axially from the ends of the sleeve so as to provide stops for limiting the amplitude of movement of the post with respect to the sleeve.

A supporting plate 16 may be attached to one of the collars and upon this plate the instrument to be cushioned against vibration may be mounted.

The collars 11 and 12 may be adjusted independently toward or away from an end of the bushing 8 to apply axial pressure to the bushing and to restrict the annular opening between the flange 6 and the collar. By adjusting a tapering end 14 toward an end of the bushing 8, the resistance of the bushing to movements of the post in a direction to carry the collar so adjusted into the sleeve may be increased. If desired the resistance to movement in one direction may be made greater than resistance to movement in the other direction by advancing one collar toward the bushing and retracting the other collar. The adjustment of each collar on the post also varies the space between the end of the sleeve 3 and the stop flange 15 of the collar so that the range of movement permitted is decreased when the stiffness of the cushion is increased, and increased when the stiffness of the cushion is decreased. In order to cushion the impact of the flanges 15 against the ends of the sleeve 3, snubbing washers 17 formed of elastic material such as rubber, are preferably mounted upon the inner faces of the flanges 15.

It will be apparent that the mounting of the present invention provides a simple and efficient vibration damping support for instruments that are mounted upon a panel or other support that is subject to vibrations and that the deflection characteristics of the mounting can be readily adjusted to suit the conditions of service.

It is to be understood that variations and modifications of the specific device herein shown and described for purposes of illustration, may be made without departing from the spirit of the invention.

What I claim is:

1. A vibration damping support comprising a sleeve having an external attaching flange intermediate its ends and inturned flanges at its ends defining end openings in the sleeve, a post extending through the sleeve coaxial therewith and having spaced externally threaded portions, a bushing of elastic rubber confined under radial compression between the post and sleeve, said bushing being engaged at its opposite ends by said inturned flanges of the sleeve and engaging the post between the threaded portions thereof, and an internally threaded collar screwed upon each threaded portion of the post, said collars having externally beveled tapering end faces extending into the end openings of the sleeve and engaging opposite ends of the bushing adjacent the post and being independently adjustable axially of the post to vary the deflection characteristics of the bushing.

2. A vibration damping support comprising a sleeve, a post extending through the sleeve, a bushing of elastic rubber confined between the post and sleeve and two collars on said post, each having an externally beveled tapering inner end engaging said bushing adjacent the post and radially inwardly of said sleeve and radially projecting portions outwardly of said tapering ends that overlie opposite ends of said sleeve and limit axial movements of said post, said collars being independently adjustable axially of said post to vary the deflection characteristics of said bushing.

3. A vibration damping support comprising a sleeve, a post extending axially through the sleeve, a bushing of elastic rubber confined between the post and sleeve, two axially adjustable collars on said post, each having a tapering inner end engaging an end of the bushing radially inwardly of the sleeve and a peripheral flange overlying an end of the sleeve and normally spaced axially therefrom, and snubbing cushions interposed between said sleeves and flanges.

4. A vibration damping support comprising a sleeve, a post extending axially through the sleeve, a bushing of elastic rubber confined between the post and sleeve, two axially adjustable collars on said post, each having a tapering inner end engaging an end of the bushing radially inwardly of the sleeve and a peripheral flange overlying an end of the sleeve and normally spaced axially therefrom, and resilient snubbing washers attached to the inner faces of said flanges.

5. A vibration damping support comprising a sleeve, a post extending centrally through the sleeve, a bushing of elastic material confined under radial compression between the sleeve and post, two collars on said post provided with peripheral flanges overlying and normally spaced axially from opposite ends of said sleeve, and snubbing cushions of elastic material mounted upon the inner faces of said flanges.

6. A vibration damping support comprising a sleeve, a post extending centrally through the sleeve, a bushing of elastic material confined under radial compression between the sleeve and post, two collars on said post provided with peripheral flanges overlying and normally spaced axially from opposite ends of said sleeve, said collars being adjustable axially of the post, and snubbing cushions of elastic material mounted upon the inner faces of said flanges.

LEON F. THIRY.

REFERENCES CITED

The following references are of record in the file of this patent:

UNITED STATES PATENTS

| Number | Name | Date |
| --- | --- | --- |
| 2,144,848 | Miller | Jan. 24, 1939 |
| 2,267,172 | Sauer | Dec. 23, 1941 |

FOREIGN PATENTS

| Number | Country | Date |
| --- | --- | --- |
| 801,707 | France | Aug. 14, 1936 |
| 466,354 | Great Britain | May 26, 1937 |
| 475,153 | Great Britain | May 7, 1936 |